United States Patent [19]
Bullivant
[11] E Re. 30,684
[45] Reissued Jul. 21, 1981

[54] DIGITAL MASS FLOW CONTROL SYSTEM

[75] Inventor: Kenneth W. Bullivant, Glassboro, N.J.

[73] Assignee: K-Tron International, Inc., Scottsdale, Ariz.

[21] Appl. No.: 564,965

[22] Filed: Apr. 3, 1975

Related U.S. Patent Documents

Reissue of:
[64] Patent No.: 3,724,720
Issued: Apr. 3, 1973
Appl. No.: 169,398
Filed: Aug. 5, 1971

[51] Int. Cl.³ ..... G05G 11/12
[52] U.S. Cl. ..... 222/55; 318/318; 222/63
[58] Field of Search ..... 222/55, 63, 71, 40, 222/59; 177/16, 21; 198/505, 855; 318/318

[56] References Cited

U.S. PATENT DOCUMENTS

| | | | |
|---|---|---|---|
| 3,110,853 | 11/1963 | Jones | 318/318 |
| 3,176,208 | 3/1965 | Gifft | 318/318 |
| 3,278,747 | 10/1966 | Ohmart | 177/16 |
| 3,303,967 | 2/1967 | Munson | 222/55 |
| 3,407,656 | 10/1968 | Chadenson | 222/55 |
| 3,412,699 | 11/1968 | Culp | 222/55 |
| 3,494,507 | 2/1970 | Ricciardi | 222/55 |
| 3,543,116 | 11/1970 | Haner | 318/318 |

OTHER PUBLICATIONS

Tech Information Bulletin 16-54a, Foxboro Co., Foxboro, Mass., Aug. 30, 1965, pp. 1-6.
98-500 Series Master Demand Module 19-450, Jul. 1969, Foxboro Co., 11/70.
98-100 Series Ratio Set Module, 19-410 Aug. 1969, Foxboro Co.
98-200 Standardized Module, 19-420, 2/70, Foxboro Co.
98-300 Series Automatic Pacing Digital Controller, 19-430, Jul. 1969, Foxboro Co., pp. 1-8.
Proportioning Systems for Food Industry, Reynold Zanetti, Merrick Scale Mfg. Co., Oct. 1970.
Control Systems for Belt Feeders, Instrumentation Technology, L. D. McEvoy, Feb. 1968, pp. 41-45.
98-400 Digital Controller with Memory, 19-440, Foxboro Co., 7/69.
Proportioning Systems, Merrick Scale Mfg. Co. Application Data Sheet ADS1041, 3/69, pp. 3-12.
Electronic Digital Techniques, Paul Kitner, McGraw Hill Book Co., pp. 258-268, 1968.
98-100 Series Ratio Set Module, Foxboro Co., GS7-7A2A-F, Sep. 1965.
Technical Information 16-51a, Foxboro Co., Aug. 30, 1965.
Technical Information 16-53a, Foxboro Co., Aug. 30, 1965, pp. 1-5.
Technical Information 16-55a, Foxboro Co., Aug. 30, 1965, pp. 1-4.
One Kiln, Two Mills, Minerals Processing, May 1966, pp. 16-19.
Total Capability, Foxboro, pp. 2-11, L-15A.
Weightometer, Merrick Co., Specification Sheet 331, 12/68.
Drawing, Merrick Scale Co., Sketch 252, 7-24-63.
Mineral Processing, Apr. 1965, pp. 19-22, Title Digital vs. Analog Proportional Feed Control.
Foxboro Catalogue, Bulletin 570, p. A54-A64.

*Primary Examiner*—B. Dobeck
*Attorney, Agent, or Firm*—Seidel, Gonda, Goldhammer & Panitch

[57] ABSTRACT

The throughput of a conveyor belt is controlled by a motor whose speed is established by the instantaneous state of an up/down counter. The counter is incremented upwardly by setpoint pulses representative of the desired mass flow rate, and downwardly by feedback pulses from a rate multiplier representative of the actual mass flow rate. When the actual mass flow rate is equal to the setpoint flow rate, the average number of setpoint pulses will equal the average number of feedback pulses with the result that the state of the counter will be stable with time. Speed control means for the motor maintains the belt speed at a level dependent upon the state of the counter. A variation between the actual and desired mass flow rates is manifested by a change in the average number of feedback pulses which results in a change in the state of the counter. The resultant change in the motor speed and hence the belt speed restores the average number of feedback pulses to equality with the setpoint pulses thus restoring stability to the counter and restoring the actual mass flow rate to the setpoint rate.

38 Claims, 3 Drawing Figures

FIG. 1
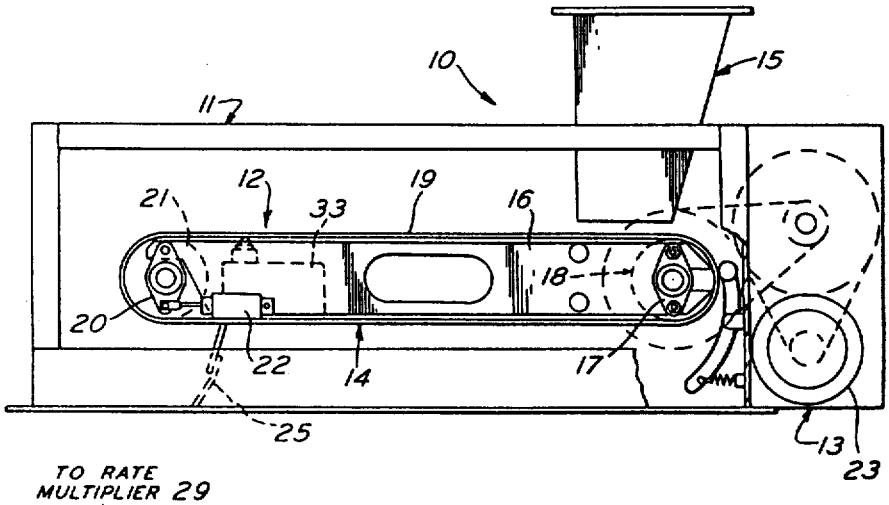
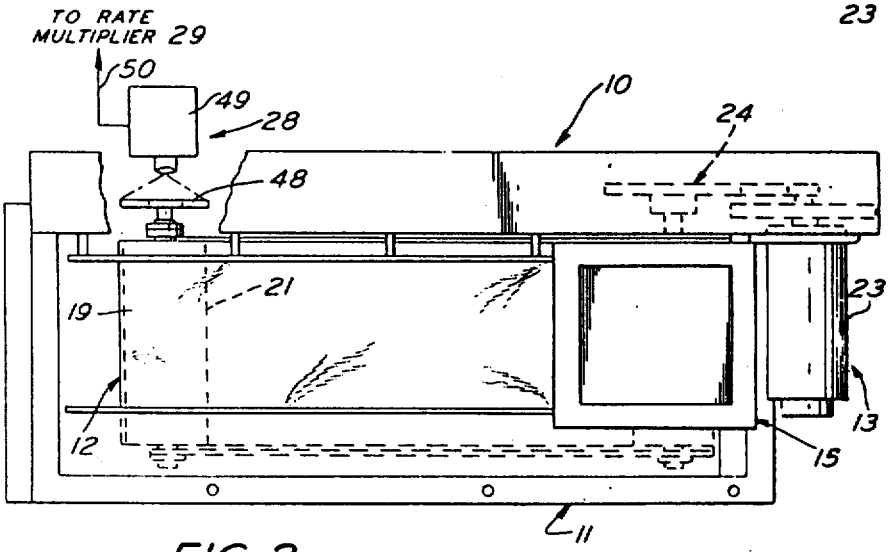
FIG. 2

DIGITAL MASS FLOW CONTROL SYSTEM

Matter enclosed in heavy brackets [ ] appears in the original patent but forms no part of this reissue specification; matter printed in italics indicates the additions made by reissue.

DETAILED DESCRIPTION

This invention relates to a digital mass flow control system for establishing and maintaining a preselected throughput of a motor driven conveyor belt.

Conventional digital mass flow control system may include a transducer and an analog-to-digital (A/D) convertor associated with the conveyor belt for providing an indication of the instantaneous mass on the conveyor belt, and a setpoint generator for establishing the desired throughput (e.g., mass per unit time) of the system. The desired throughput or the setpoint of the system is established by the average frequency of the setpoint pulses produced by the setpoint generator. These pulses are counted in a counter of a digital comparator which produces an output pulse when the count reaches a value determined by the contents of a storage register whose state is established by the output of the A/D convertor. The output pulse serves to clear the counter and increment the stepping motor that drives the belt whereby the latter is also incremented.

While the above described system is satisfactory, there are advantages in having the belt driven continuously rather than intermittently, and in providing the control system with feedback information on the belt speed. The primary object of the present invention, therefore, is to provide a novel digital mass flow control system capable of achieving the results just described.

Briefly, these and other objects of the present invention are achieved by using a variable speed motor to drive the belt wherein the speed of the motor is established by the instantaneous state of an up/down counter. The counter is incremented upwardly by setpoint pulses representative of the desired flow rate, and downwardly by feedback pulses from a rate multiplier representative of the actual mass flow rate. The pulse input to the rate multiplier is a train of pulses whose instantaneous frequency is a function of the instantaneous belt speed, and is derived from an encoder responsive to rotation of the conveyor belt pulley. The level input to the rate multiplier, which establishes the fraction of the count passed by the multiplier, is derived from an A/D converter whose input is a signal produced by a transducer that measures the instantaneous mass of material on the belt of the conveyor. The output of the rate multiplier is thus a train of feedback pulses whose number per unit time is representative of and may serve as an indication of the actual mass flow rate of material. These feedback pulses increment the counter downwardly.

When the actual mass flow rate is equal to the setpoint flow rate, the average number of feedback pulses will be equal to the average number of setpoint pulses with the result that the state of the counter will be stable with time. Speed control means for the motor maintains a belt speed at a level dependent upon the state of the counter. A variation between the actual and desired mass flow rates is manifested by a change in the average number of feedback pulses which results in a change in state of the counter. The resultant change in the motor speed and hence the belt speed restores the average number of feedback pulses to equality with the setpoint pulses thus restoring stability to the counter and stopping any further change in motor speed. Under this condition, the actual mass flow rate is again equal to the setpoint rate. From the above description, it should be apparent that the state of the counter is representative of the speed at which the motor must drive the belt in order to maintain the actual mass flow rate equal to the setpoint rate.

The features of this invention for which protection is sought are pointed out with particularity in the appended claims. The invention itself, however, both as to its organization and method of organization, together with further objects and advantages thereof, may best be understood by reference to the following description taken in connection with the accompanying drawings, wherein like parts in each of the several figures are identified by the same reference character, and wherein:

FIG. 1 is a schematic view in elevation of a feeder into which the present invention may be incorporated;

FIG. 2 is a schematic plan view of the feeder shown in FIG. 1 with portions broken away for purposes of illustration.

Figure 3:
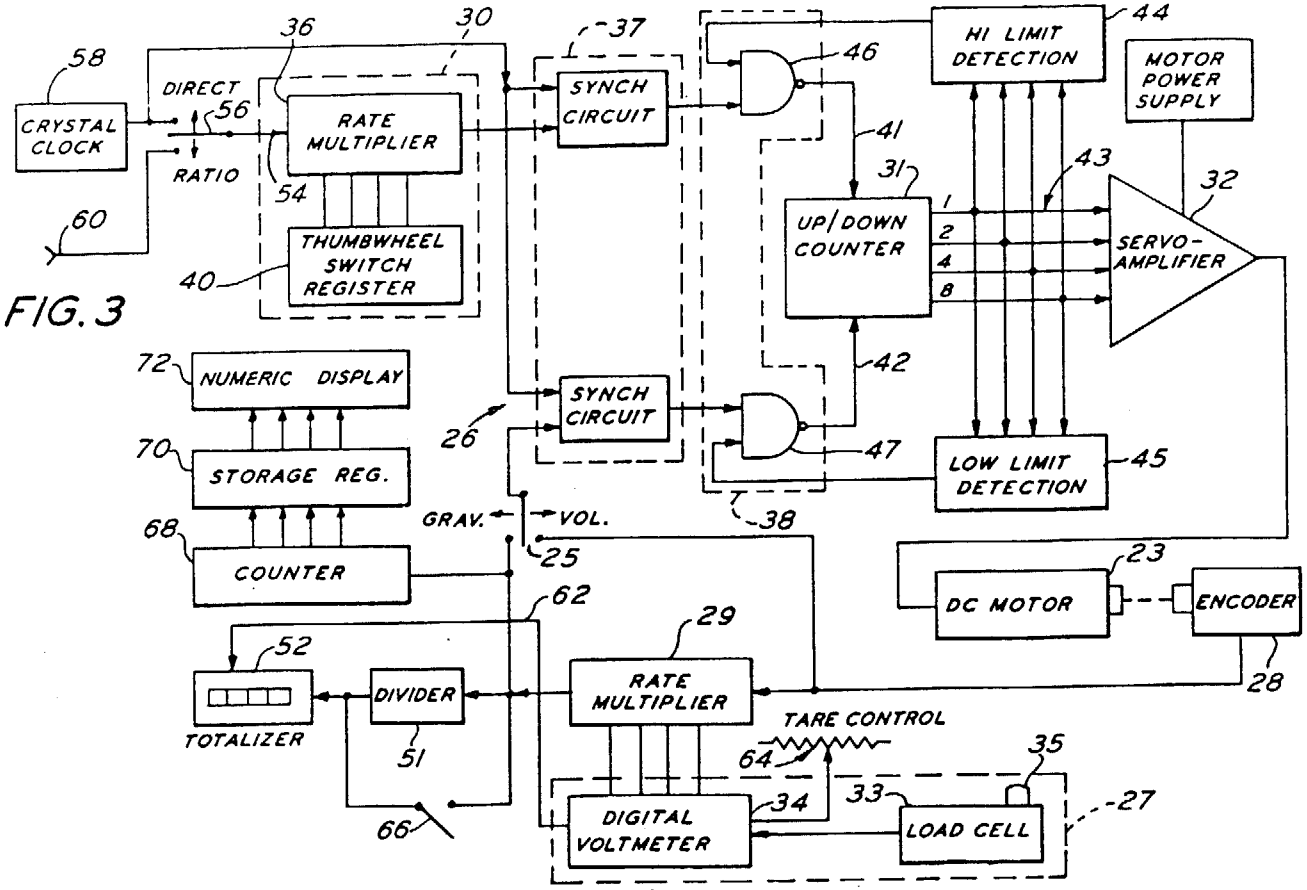
FIG. 3 is an electrical schematic diagram showing details of the control circuit.

Referring now to FIG. 1 of the drawing, a typical feeder into which the present invention may be incorporated is designated generally by reference 10. Feeder 10 includes a structural base 11, conveyor belt system 12, and drive means 13 operatively associated with the conveyor belt system. System 12 includes conveyor belt 14 and hopper feeder 15. Conveyor belt 14 comprises a pair of spaced longitudinally extending support members-16 rigidly connected to the structural base 11 of the feeder, and providing at the end adjacent hopper 15, a rigid support for a pair of laterally spaced bearings 17 on which is rotatably mounted drive pulley 18 carrying endless belt 19 upon which is deposited dry granular material from hopper 15. Pivotally mounted at the opposite end of support member 16, is a pair of attached 20 upon which is rotatably mounted another pulley 21. Belt 19 rides over each of pulleys 18 and 21, with tension being provided by belt tension means 22. One end of tension means 22 is attached to support member 16, and the other end is attached to a bearing 20 at a point remote from its pivotal connection to support 16.

Drive means 13 comprises electric motor 23 attached to structural base 11, and speed reducer means 24 by which the output of the electric motor is coupled to the drive pulley 18 of the conveyor belt system. Preferably, motor 23 is a D.C. device with a permanent magnet field. The speed of motor is controlled by changing armature current. Increasing the armature current speeds up the motor; and decreasing the armature current slows down the motor.

In operation, dry granular material contained in hopper 15 is deposited on the top surface of belt 19 adjacent pulley 18 by means of a conventional valve (not shown). Rotation of electric motor 23 imparts movement to conveyor belt 19 which conveys the dry granular material lengthwise toward pulley 21. Upon reaching this pulley, further belt movement causes the material to be dumped into outlet hopper 25. The digital mass flow control system shown in detail in FIG. 3 controls the speed of motor 23 such that a constant mass flow rate (mass per unit time) will be dumped into hopper 25 regardless of the rate at which material from the hopper 15 is deposited on belt 19.

Referring now to FIG. 3, reference numeral 26 designates the digital mass flow control system made in accordance with the present invention. Control system 26 comprises weighing means 27 and encoder means 28 associated with belt 19, first digital means 29 responsive to the digital signals of the weighing means and the encoder means for producing feedback pulses representative of the actual mass flow rate, setpoint means 30 for producing setpoint pulses representative of the desired mass flow rate, second digital means 31 responsive to the feedback and setpoint pulses, and control means 32 associated with motor 23 for controlling its speed.

Weighing means 27 comprises transducer or load cell 33 and an analog-to-digital convertor in the form of digital voltmeter 34. Transducer 33 is rigidly attached to support member 16 of the conveyor belt system and includes a detector arm 35 which is in operative contact with belt 19. Transducer 33 is conventional and well known in the art, and may be a Type 407000 load cell manufactured by K-Tron Corporation. The weight of the material on the belt causes arm 35 to be deflected, and transducer 33 responds by producing an analog signal representative of the instantaneous mass of material on belt 19. Digital voltmeter 34 includes a storage register whose state is established by the level of the analog signal produced by transducer 33. Such state is the digital representation of the instantaneous mass of the material on the belt, and this value can be visually displayed by reading-out the state of the storage register.

The storage register of digital voltmer 34 is associated with a rate multiplier which constitutes first digital means 29. A rate multiplier is a conventional digital device that effectively multiplies an applied pulse train by a number. Essentially, a rate multiplier is a pulse train distributor which is effective to distribute various fractions of the input pulses into different lines each of which is ANDed with a different level signal derived from an associated cell of a storage register which holds the multiplier. The output of the rate multiplier is derived from all of the outputs of the AND gates. Only a gate whose association cell furnishes an assertion level will pass the fraction of the input pulses by thereto, with the result that the total fraction of input pulses pass by the rate multiplier will depend upon which cells of the storage register provide assertion levels.

Consider, for example, a three cell binary rate multiplier to which a pulse train is applied. One-half of the input pulses (e.g., four of each group of eight input pulses) will be sent along a first output line; one-fourth of the input pulses (e.g., two out of each group of eight input pulses) will be sent along a second output line; and one-eighth of the input pulses (e.g., one out of each group of eight input pulses) will be sent along a third output line. Each of these output lines is ANDed with a level derived from a three cell storage register whose contents represents the multiplier. If there were an assertion level present only at the AND gate associated with the first output line of the pulse distributor, the multiplier would be one-half, and the output of the rate multiplier would be pulses coincident in time with the first, third, fifth and seventh pulses of each group of eight input pulses. If there were an assertion level present only at the AND gate associated with the second line of the pulse distributor, the multiplier would be one-fourth, and the output of the rate multiplier would be pulses coincident in time with the second and sixth pulse of each group of eight input pulses. If there were an assertion level present only at the AND gates of each of the first and second lines of the pulse distributor, the multiplier would be three-fourths, and the output of the rate multiplier would be pulses coincident in time with the first, second, third, fifth, sixth, and seventh pulse of each group of eight input pulses. An assertion level present at each AND gate corresponds to a multiplier of seven-eights, and would permit the rate multiplier to pass pulses coincident in time with the first seven of each group of eight input pulses. By selectively varying the assertion levels, from one through seven pulses of each group of eight input pulses can be passed by the rate multiplier.

From the above description, it should be apparent that the number of cells of the rate multiplier determines the size of the group of input pulses that establishes the basis for distribution, and that the time period required for this group of pulses to be received by the multiplier determines a reference period of time. Within such period of time, from one through a number equal of one less than the total number of pulses in a group can be passed by the multiplier, depending on the contents of the storage register. As a consequence, the average frequency of the output pulses of a rate multiplier, namely the number of output pulses per reference period of time, depends on the contents of the storage register.

Rate multipliers are not limited to binary counters, and are available for binary-coded-decimal (BCD) counters, for example. In the BCD system of counting, a four cell counter is provided for each decimal place, and is arranged to count from 0 to 9 rather than to 15. Using this arrangement, a BCD rate multiplier could pass between one and nine pulses in each group of ten input pulses, depending on the contents of a four cell storage register. If an eight cell counter were involved to provide two decimal places, from one through 99 pulses in each group of one hundred pulses could be passed by the multiplier.

The present invention contemplates using a standard digital voltmeter as a storage register for rate multiplier 29. Voltmeters conventionally used BCD readout; and for this reason rate multiplier 29 is a BCD rate multiplier. However, other types of analog-to-digital converters could be used to convert the analog signal produced by cell 33 to a digital signal. In such case, the rate multiplier would be selected to be compatible with the converter.

Returning now to the description of the present invention, the output of encoder 28, which is a pulse train whose number of pulses per unit time is representative of the instantaneous belt speed, is applied to the pulse input of multiplier 29. The storage registers of voltmeter 34, whose contents are representative of the instantaneous mass of the material on the belt, are applied to the level input terminals of multiplier 29. As a consequence of this arrangement, the output of rate multiplier 29 is a train of feedback pulses whose number per unit time is representative of the actual instantaneous mass flow rate of material on the belt.

Turning now to setpoint means 30, a train of pulses is applied to the pulse input terminal 54 of rate multiplier 36 through switch 56. The pulses may be produced by a crystal oscillator or clock 58. Alternatively, pulses may be applied to the pulse input terminal 54 of rate multiplier 36 through input terminal 60 and switch 56. If the output of a variable frequency source (not shown) is applied to input terminal 60 with switch 56 in the ratio position, the output of rate multiplier 36 will be equal to that frequency input times the decimal fraction set on thumbwheel switch register 40. By using a variable frequency source as the input to input terminal 60 of several conveyors, the total mass flow rate may be varied while the percentage of the whole mass flow by each conveyor will remain constant. The variable frequency source may be the output obtained from rate multiplier 29 of another similar conveyor thereby permitting slaving of one unit to another. Alternatively, the digital mass flow control system of a conveyor may be slaved to any suitable device such as a turbine flow meter which produces a suitable pulse signal.

Rate multiplier 36 is of the same type as rate multiplier 29. The level input terminals of rate multiplier 36 are connected with thumbwheel-switch register 40 which permits assertion levels to be selectively applied to each of the gates of the pulse distributor of multiplier 36. A manual setting of the contents of the thumbwheel-switch register determines the multiplier term by which the clock pulses are to be multiplied. The output of multiplier 36 is thus a train of setpoint pulses whose number per unit time is representative of the desired instantaneous mass flow.

With switch 25 in the gravity position, the pulse trains from rate multipliers 29 and 36 are applied through synch means 37 and gate means 38 to second digital means 31 constituted by an up/down digital counter. The setpoint pulse train from rate multiplier 36 is applied to "up" terminal 41 while the feedback pulse train derived from multiplier 29 is applied to the "down" terminal 42 of the counter. Thus, the pulses representative of the desired instantaneous mass flow rate will cause counter 31 to count upwardly, while pulses representative of the actual instantaneous mass flow rate will cause counter 31 to count downwardly. When the number of pulses per unit time in each pulse train is the same, the state of counter 31 will be stable. In such case, the actual mass flow rate of material on the belt will be the desired setpoint rate.

From the above description, it can be seen that the instantaneous state of up/down counter 31 is representative of the speed at which motor 23 must be driven in order to establish equality between the desired and actual mass flow rate. Control means 32, in the form of a current-output type servoamplifier, converts the contents of counter 31 to an analog signal the level of which determines the amount of armature current furnished to motor 23. To this end, the output lines 43 associated with the cells of counter 31 may have the usual binary weights: 1, 2, 4, 8, etc. These lines are associated with similarly weighted control circuit in servoamplifier 32. The level of output current from servoamplifier 32 will thus depend upon which of the output lines 43 of counter 31 are asserted.

When there is a reduction in the rate at which granular material is deposited from hopper 15 onto belt 19, the mass material on the belt decreases. Since there is now less material on the belt, the amount of material being dumped into hopper 25 per unit time will decrease unless the belt speed is increased. System 26 effects the necessary increase in motor speed as follows. First, the reduction of mass of material on the belt reduces the contents of the storage register of voltmeter 34. Such contents, it will be recalled, represent the quantity by which the pulses from encoder 28 are multiplied. A reduction in the contents of the storage register of voltmeter 34 results in a reduction in the average number of pulses produced by rate multiplier 29 and applied to the "down" terminal 42 of counter 31. When this occurs, the average frequency of the setpoint pulses produced by rate multiplier 36 and applied to the "up" terminal of counter 31 exceeds the average frequency of the feedback pulses applied to the "down" terminal. The excess setpoint pulses cause counter 31 to begin to count upwardly thus disturbing the stability of the state of the counter. As the contents of counter 31 increase, output lines 43 of the greater weight are asserted causing servoamplifier 32 to furnish more armature current to motor 23 thus speeding up the motor. The resultant increase in the belt speed of the conveyor is detected by encoder 28 which produces pulses at a greater frequency. Consequently, the average frequency of the feedback pulses produced by rate multiplier 29 will increase reducing the rate at which the contents of counter 31 can increase. As the average frequency of the setpoint and feedback pulses approach equality, counter 31 is stabilized at a new state and the actual flow rate is restored to the setpoint value.

If, for some reason, there is an increase in the rate at which granular material is deposited by hopper 15 onto belt 19, a constant mass flow rate can be maintained only by slowing the conveyor belt. System 26 effects the necessary decrease in motor speed as follows. As the mass of the material on belt 19 increases, there will be an increase in the level of the signal produced by load cell 33 with result that the contents of the storage register of voltmeter 34 will increase. This will effectively increase the value of the term by which the pulses produced by encoder 28 are multiplied in multiplier 29. The average frequency of the output of multiplier 29 will thus increase causing counter 31 to begin to count downwardly. As the stability of the counter is disturbed, output lines 43 of lesser weight will be asserted causing servoamplifier 32 to produce less current for the armature of motor 23. As the motor slows, the belt speed will decrease, decreasing the frequency of the pulse train produced by encoder 28. The average frequency of the pulses produced by multiplier 29 will also decrease thus reducing the rate at which the contents of counter 31 can decrease. This continues until correspondence is established between the average frequency of the outputs of each of the two multipliers. Counter 31 will thereupon reach a new stable state; and once more, the actual mass flow rate will correspond to the setpoint value.

In summary, changes in the rate at which granular material is deposited by hopper 15 onto belt 19 is sensed by load cell 33 which is effective to change the value of the term by which the pulses produced by encoder 28 are multiplied. As the average frequency of the pulse train produced by multiplier 29 changes in response to changes in the rate at which granular material is deposited on belt 19, the state of counter 31 will change. Such change will cause the motor speed to change in such a way as to restore the average frequency of the train of feedback pulses produced by multiplier 29 to the same value as the average frequency of the train of setpoint pulses produced by multiplier 36. The stability of counter 31 will thus be restored at a new state at which the motor will maintain the belt speed at a level where the actual mass flow rate is equal to the setpoint value.

Conventional up/down counters will not operate properly when coincident pulses appear at the "up"

terminal and the "down" terminal. Because the pulse train produced by rate multiplier 29 is asynchronous with respect to the pulse train produced by rate multiplier 36, it is possible for individual pulses in these two trains to be coincident in time. To insure proper operation, synch circuit 37 is utilized. This is a conventional circuit which will synchronize the setpoint pulses produced by multiplier 36 and feedback pulses produced by multiplier 29 with alternate half cycles of a clock frequency higher than the maximum setpoint or feedback rate. In this manner, correct counting will be achieved even if setpoint and feedback pulses should occur simultaneously.

When system 26 is unable to provide sufficient corrective action to restore the actual mass flow rate to the setpoint value, counter 31 will continuously count either upwardly or downwardly depending upon the corrective action required. Eventually, the counter would either "overflow" and change from its highest state to its lowest state, or would "underflow" and change from its lowest state to its highest state causing a serious discontinuity in the operation of amplifier 32 and motor 23. To preclude the occurrance of these events, decoding circuits 44 and 45 are employed in connection with output lines 43 of counter 31. Decoding circuit 44 will detect the maximum counter output and produce a control signal at inhibit gate 46 of gate means 38 preventing passage of additional setpoint pulses from multiplier 36 which would normally cause counter 31 to count upwardly and result in an "overflow" situation. Similarly, decoding circuit 45 will detect the minimum counter output and produce a control signal at inhibit gate 47 blocking additional feedback pulses from multiplier 29 that would normally cause counter 31 to count downwardly and result in an "underflow" situation. The signals derived from decoding circuits 44 and 45 may also be used to initiate an alarm or cause the motor to be shut down.

The servoamplifier may be biased so that current flow to the motor armature will begin at some counter value greater than one. This will provide a memory capacity of several counts should the motor armature turn rapidly after overcoming static friction and cause several extra feedback pulses to be applied to the "down" terminal 42 of the counter. Because of these remembered pulses, the motor will not start again until the extra pulses have been offset by incoming setpoint pulses applied to "up" terminal 41.

Alternatively, counter 31 may be provided with five binary stages thereby having 32 possible states or counts. Gating means, not shown, may be provided to gate the upper 16 counts of the five stage binary counter to serve as the input to servo amplifier 32. The lower 16 counts of the five stage binary counter may serve as a memory reserve for conditions where the feedback pulses have exceeded setpoint pulses. This digital arrangement may be used as an alternative to biasing servo amplifier 32 as described above. However, it is to be understood that the description in terms of counter 31 being a four or five stage binary counter is not intended to be limiting. Counter 31 in the digital arrangement may be larger or smaller than a five bit counter. For example, counter 31 may be a six bit binary counter in which the upper 32 or some other suitable number of counts are gated to serve as the input to servo amplifier 32 and the remaining lower counts serve as a memory. In addition, memory may also be provided at the upper end of the counter range for conditions where motor 23 may not be able to immediately follow a rapidly increasing setpoint due to physical limitations. Under conditions where motor 23 is not able to perfectly track a rapidly increasing setpoint, means would be provided to hold the gates to the input of servo amplifier 32 in an enabled condition.

Encoder 28 is a conventional device for converting shaft rotation into a digital signal. As seen in FIG. 2, encoder 28 includes a coded disc 48 attached to the shaft upon which belt pulley 21 is mounted. Optical device 49 of the encoder views disc 48 as it rotates in response to belt movement causing a pulsed signal to appear at output lead 50. This pulsed signal will ave a frequency directly related to the belt speed. While an optical encoder is disclosed, it will be obvious to persons skilled in the art that other types of encoders could also be employed such as a proximity type magnetic pickup with a gear made of a magnetic material.

Because the output of rate multiplier 29 is a pulse train whose average number of pulses is directly related to the actual mass flow of material on belt 19, each pulse appearing at the output of multiplier 29 represents a discrete increment of mass passed by the belt. The total mass of material passed by the conveyor can therefore be accumulated by scaling and counting the output of multiplier 29. To achieve this result, scaling means 51 divides the pulses produced by multiplier 29 by a predetermined value and provides output pulses accumulated in counter 52. The contents of counter 52 will represent the total mass of material passed by the conveyor belt 19.

Preferably, counter 52 is a bi-directional counter. Counter 52 receives a countup or a countdown signal via line 62 from digital voltmeter 34. Digital voltmeter 34 may be provided with means 64 which provides a tare control. Means 64 may be a zero adjust on commercially available digital voltmeters. Means 64 allows adjustment to produce a zero output level from digital voltmeter 34 for a predetermined input from load cell 33. In order to accurately tare a conveyor belt system it is desirable to have the counter 52 with a readout which is bi-directional in operation. The operator will be assured that the conveyor system is properly tared if counter 52 does not show a significant net change of reading with an empty conveyor belt despite minor positive and negative excursions caused by variations in the geometry and composition of the conveyor belt. This bi-directional operation of counter 52 is accomplished by providing a polarity output signal on line 62 from digital voltmeter 34 as aforesaid. A switch 66 is provided to by-pass scaling means 51 in order to provide greater sensitivity during the taring operation of the conveyor belt.

Switch 25 permits by-passing of rate multiplier 29 when in the volumetric position. Switch 25 in the volumetric position allows the direct feedback of pulses from encoder 28 to up/down counter 31 through synch means 37 and gate means 38. This allows direct control of the conveyor belt speed as contrasted with mass flow or gravity control which is a function of conveyor belt speed and conveyor belt loading. Operation in the volumetric mode may be advantageously used for taring the conveyor belt and for emergency operation as a volumetric (as opposed to a gravimetric) feeder in emergencies such as failure of the load cell 33.

A mass flow rate readout is provided by counter 68, storage register 70 and numeric display 72. The output of rate multiplier 29 as described above is a pulse train having a frequency representative of the mass flow on the conveyor belt 14. Counter 68 os provided with timing means which allows it to count for a predetermined period of time. At the end of each predetermined period of time, the contents of counter 68 is transferred to storage register 70. The count stored in storage register 70 is displayed by numeric display 72 providing a visual readout. By suitable selection of the predetermined period of time during which counter 68 counts, numeric display 72 will read directly in engineering units which may be, for example, pounds per hour.

It may also be noted that encoder 28, weighing means 27, rate multiplier 29, scaling means 51, counters 52 and 68, storage register 70 and numeric display 72 may be operated independently of the remainder of the system as a total mass flow indicator and a mass flow rate indicator.

*As used herein the term "N" includes an integer greater than zero.*

The present invention may be embodied in other specific forms without departing from the spirit or essential attributes thereof and, accordingly, reference should be made to the appended claims, rather than to the foregoing specification as indicating the scope of the invention.

What is claimed is:

[1. A digital volumetric flow control system for use with a motor driving a conveyor belt having means for feeding material onto the belt at a constant rate, said system comprising:

first digital means for producing a digital signal in the form of a train of feedback pulses whose frequency is representative of the speed of said conveyor belt, each of said feedback pulses representing an increment of movement of said conveyor belt;

set point means for generating a digital signal in the form of a train of pulses representative of the desired volumetric flow rate;

second digital means responsive to the feedback pulses from said first digital means and set point pulses from said set point means for producing a digital control signal representative of the speed at which said motor must drive the belt in order to establish equality between the desired and the actual volumetric flow rate, said second digital means cancelling a set point pulse for each feedback pulse or vice versa, and being operative to store any excess set point or feedback pulses not cancelled; and said control means responsive to said control signal for controlling the speed of said motor.]

[2. A digital volumetric flow control system according to claim 1 wherein said second digital means comprises an up/down counter, said up/down counter being counted up in response to set-point pulses and being counted down in response to feedback pulses.]

[3. A digital mass flow control system for use with a motor driving a conveyor belt having means for feeding material onto the belt, said system comprising:

first digital means for producing a digital signal in the form of a train of feedback pulses whose frequency is representative of the actual mass flow rate of material on the said conveyor belt, each of said feedback pulses representing an increment of mass;

setpoint means for generating a digital signal in the form of a train of pulses representative of the desired mass flow rate;

second digital means responsive to the feedback pulses from said first digital means and set point pulses from said set point means for producing a digital control signal representative of the speed at which said motor must drive the belt in order to establish equality between the desired and the actual mass flow rate, said second digital means cancelling a set point pulse for each feedback pulse or vice versa, and being operative to store any excess set point or feedback pulses not cancelled; and speed control means responsive to said control signal for controlling the speed of said motor.]

[4. A digital mass flow control system according to claim 3 wherein the digital signal produced by said setpoint means is a train of setpoint pulses whose average frequency is representative of the desired mass flow rate, and wherein said second digital means includes an up/down digital counter having a terminal to which applied pulses cause the counter to count upwardly and a terminal to which applied pulses cause the counter to count downwardly, said feedback and setpoint pulses being applied to respective terminals of said up/down digital counter.]

[5. A digital mass flow control system according to claim 4 wherein said second digital means includes gating means, said gating means disabling an output of the instantaneous state of said up/down counter below a predetermined count and enabling an output of the instantaneous state of said up/down counter above said predetermined count.]

[6. A digital mass flow control system according to claim 4 wherein the instantaneous state of said up/down counter constitutes said digital control signal.]

[7. A digital mass flow control system according to claim 6 wherein said speed control means includes a digital-to-analog converter responsive to the state of said up/down counter for converting said digital control signal to an analog signal that establishes the motor speed.]

8. A digital mass flow control system according to claim [3 including] *26 wherein said first digital means includes* weighing means associated with said conveyor belt for producing a digital signal representative of the instantaneous mass of material on said conveyor belt, encoder means associated with said conveyor belt for producing a digital signal representative of the instantaneous rate of movement of said conveyor belt, said first digital means being responsive to the digital signals of said weighing means and said encoder means for producing said digital signal representative of the instantaneous actual mass flow rate of material on said conveyor belt.

9. A digital mass flow system according to claim 8 wherein said encoder means produces a pulse train whose instantaneous frequency is representative of the instantaneous speed of said conveyor belt.

10. A digital mass flow system according to claim 9 wherein said encoder comprises a gear composed of a magnetic material and being provided with a plurality of teeth, said gear being mounted upon the shaft of said motor driving said conveyor belt and a magnetic pickup being mounted in proximity to said teeth of said gear.

11. A digital mass flow control system according to claim 9 wherein said weighing means includes a transducer for producing an analog signal representative of the instantaneous mass of material on said belt, and an analog-to-digital converter having a storage register whose contents constitute a digital representation of the instantaneous mass of material on said belt.

12. A digital mass flow control system according to claim 11 wherein said first digital means includes a rate multiplier having a pulse input terminal and level input terminals, said pulse input terminal being connected to the output of said encoder means, and said level input terminals being connected to said storage register of said converter, the output of said rate multiplier being a train of feedback pulses whose average frequency is representative of the actual mass flow rate.

13. A digital mass flow control system according to claim 12 wherein said converter is a digital voltmeter.

14. A digital mass flow control system according to claim 12 including means for scaling the output of said rate multiplier for producing a scaled digital signal in the form of a pulse train, each pulse of which represents a discrete increment of mass delivered by said conveyor belt, and a counter for counting the pulses produced by said scaling means whereby the state of said counter represents the total mass of material passed by said conveyor belt.

15. A digital mass flow control system according to claim 14 wherein means are provided to adjust the contents of said storage register of said converter to zero for a prdetermined input to said converter to provide a tare control.

16. A digital mass flow control system according to claim 15 wherein said counter for counting the pulses produced by said scaling means ia a bi-directional counter which receives a countup or a countdown signal from said converter means.

17. A digital mass flow control system according to claim 12 including a mass flow rate counter means, said mass flow rate counter means including a counter for repetitively counting the pulses at said output of said rate multiplier for predetermined periods of time, a storage register for storing the contents of said counter at the end of each predetermined period of time, and display means for displaying the count stored in said storage register.

18. A digital mass flow indicator system for use with a motor driven conveyor belt having means for feeding material onto the belt, comprising:

weighing means associated with said conveyor belt for producing a digital signal representative of the instantaneous mass of material on said conveyor belt;

encoder means associated with said conveyor belt for producing a digital signal in the form of a pulse train whose instantaneous frequency is representative of the instantaneous rate of movement of said conveyor belt;

*digital rate* multiplier means responsive to the digital signals produced by said weighing means and said encoder means for producing a digital signal in the form of a pulse train, *each pulse in said train representing an instantaneous increment of mass on said belt, the frequency of said pulse train representing instantaneous mass flow*; and means for scaling the pulse train digital signal produced by said multiplier means to produce a digital signal pulse train in which each pulse is representative of an increment of mass delivered by said conveyor belt *in predetermined dimensions.*

19. A digital mass flow indicator system according to claim 18 wherein said weighing means includes a transducer for producing an analog signal representative of the instantaneous mass of material on said belt, and an analog-to-digital converter having a storage register whose contents constitute a digital representation of the instantaneous mass of material on said belt.

20. A digital mass flow indicator system according to claim 19 wherein said multiplier means is a rate multiplier having a pulse input terminal and level input terminals, said pulse input terminal being connected to the output of said encoder means, and said level input terminals being connected to said storage register of said converter, the output of said multiplier being a digital signal representative of the instantaneous actual mass flow rate of material on said conveyor belt.

21. A digital mass flow indicator system according to claim 20 wherein said converter is a digital voltmeter.

22. A digital mass flow indicator system according to claim 20 including a counter for counting the pulses produced by said scaling means whereby the state of said counter represents the total mass of material passed by said conveyor belt.

23. A digital mass flow indicator system according to claim 22 whwerein means are provided to adjust the contents of said storage register of said converter to zero for a predetermined input to said converter to provide a tare control.

24. A digital mass flow indicator system according to claim 23 wherein said counter for counting the pulses produced by said scaling means is a bi-directional counter which receives a countup or a countdown signal from said converter means.

25. A digital mass flow indicator system according to claim 20 including a mass flow rate counter means, said mass flow rate counter means including a counter for repetitively counting the pulses at said output of said rate multiplier for predetermined periods of time, a storage register for storing the contents of said counter at the end of each predetermined period of time, and display means for displaying the count stored in said storage register.

*26. A digital mass flow control system for use with a motor driving a conveyor belt having means for feeding material onto the belt, said system comprising:*

*first digital means for producing a digital signal in the form of a train of feedback pulses whose frequency is representative of the actual mass flow rate of material on said conveyor belt, each of said feedback pulses representing an increment of mass;*

*set point means for generating a digital signal in the form of a train of pulses representative of the desired mass flow rate;*

*second digital means responsive to the feedback pulses from said first digital means and set point pulses from said set point means for producing a digital control signal representative of the speed at which said motor must drive the belt in order to establish equality between the desired and the actual mass flow rate, said second digital means canceling a set point pulse for each feedback pulse or vice versa, and being operative to store any excess set point or feedback pulses not canceled; and*

*speed control means responsive to said digital control signal for controlling the speed of said motor, said speed control means including means for disabling said motor until said digital control signal reaches some predetermined value greater than one.*

*27. A digital mass flow control system in accordance with claim 26 wherein said speed control means is a servo-amplifier responsive to said second digital means for con-*

*verting said digital signal to an analog signal that establishes the motor speed and wherein said servo-amplifier is biased so that current flow to the motor begins when said digital control signal reaches some predetermined value greater than one.*

*28. A digital mass flow control system according to claim 26 wherein the digital signal produced by said set point means is a train of set point pulses whose average frequency is representative of the desired mass flow rate, and wherein said second digital means includes an up/down digital counter having a terminal to which applied pulses cause the counter to count upwardly and a terminal to which applied pulses cause the counter to count downwardly, said feedback and set point pulses being applied to respective terminals of said up/down counter.*

*29. A digital mass flow control system in accordance with claim 28 wherein said up/down digital counter is an N stage binary counter.*

*30. A digital mass flow control system in accordance with claim 29 wherein said speed control means is a current output servo-amplifier and wherein said means for disabling said motor until said digital control signal reaches some predetermined value greater than one includes gating means for gating only the higher order stages of said up/-down digital counter to the input of said servo-amplifier.*

*31. A digital mass flow control system in accordance with claim 28 wherein said means for disabling said motor until said digital control signal reaches some predetermined value greater than one includes gating means for disabling an output of the instantaneous state of said up/-down counter below said predetermined count greater than one and enabling an output of the instantaneous state of said up/down counter above said predetermined count greater than one.*

*32. A digital volumetric flow control system for use with a motor driving a conveyor belt having means for feeding material onto the belt at a substantially constant rate, said system comprising:*

*first digital means for producing a digital signal in the form of a train of feedback pulses whose frequency is representative of the speed of said conveyor belt, each of said feedback pulses representing an increment of movement of said conveyor belt;*

*set point means for generating a digital signal in the form of a train of pulses representative of the desired volumetric flow rate;*

*second digital means responsive to the feedback pulses from said first digital means and set point pulses from said set point means for producing a digital control signal representative of the speed at which said motor must drive the belt in order to establish equality between the desired and actual volumetric flow rate, said second digital means canceling a set point pulse for each feedback pulse or vice versa, and being operative to store any excess set point or feedback pulses not canceled; and*

*speed control means responsive to said control signal for controlling the speed of said motor, said speed control means including means for disabling said motor until said digital control signal reaches some predetermined value greater than one.*

*33. A digital volumetric flow control system in accordance with claim 32 wherein said speed control means is a current output servo-amplifier responsive to said second digital means for converting said digital control signal to an analog signal that establishes the motor speed and wherein said servo-amplifier is biased so that current flow to the motor begins when said digital control signal reaches some predetermined value greater than one.*

*34. A digital volumetric flow control system in accordance with claim 31 wherein said second digital means comprises an up/down counter, said up/down counter being counted up in response to set point pulses and being counted down in response to feedback pulses.*

*35. A digital volumetric flow control system in accordance with claim 34 wherein said up/down counter is an N stage binary counter.*

*36. A digital volumetric flow control sytem in accordance with claim 35 wherein said speed control means is a servo-amplifier responsive to said digital control signal for converting said digital control signal to an analog signal that establishes the motor speed and wherein said means for disabling said motor until said digital control signal reaches some predetermined value greater than one includes gating means for gating only the higher order stages of said binary counter to the input of said servo-amplifier.*

*37. A digital volumetric flow control system in accordance with claim 34 wherein said digital control signal reaches some predetermined value greater than one includes gating means for disabling an output of the instantaneous state of said up/down counter below said predetermined count greater than one and enabling an output of the instantaneous state of said up/down counter above said predetermined count greater than one.*

*38. A digital mass flow control system according to claim 8 including means for selectively bypassing said weighing means to cause said first digital means to be directly responsive to said encoder means, whereby said first digital means produces a digital signal representative of the instantaneous volumetric flow rate of material on the conveyor belt.*

*39. A digital material flow control system for use with a motor driving a conveyor belt having means for feeding material onto the belt, said system comprising:*

*encoder means associated with said conveyor belt for producing a first digital signal representative of the instantaneous rate of movement of said conveyor belt;*

*weighing means associated with said conveyor belt for producing a second digital signal representative of the instantaneous mass of material on said conveyor belt;*

*first digital means responsive to said first and second digital signals for producing a third digital signal in the form of a train of feedback pulses whose frequency is representative of the actual rate of mass flow of material on said conveyor belt, each of said feedback pulses representing an increment of mass;*

*set point means for generating a fourth digital signal in the form of a train of pulses whose frequency is representative of the desired flow rate;*

*up/down counter means having up and down input terminals for producing a digital control signal representative of the speed at which said motor must drive the belt in order to establish equality between the desired and the actual flow rate, said up/down counter means counting up one count for each pulse applied to said up input terminal and counting down one count for each pulse applied to said down input terminal;*

*means for applying said fourth digital signal to said up input terminal;*

*means for selectively applying either said first or said third digital signals to said down input terminal of said up/down counter means whereby said material flow control system operates as a volumetric flow con-*

*trol system when said first digital signal is applied to said down input terminal and as a mass flow control system when said third digital signal is applied to said down input terminal; and*

*speed control means responsive to said digital control signal for controlling the speed of said motor.*

*40. A digital material flow control system in accordance with claim 39 wherein said weighing means includes a load cell associated with said conveyor belt for producing an analog signal representative of the instantaneous mass of material on said conveyor belt and a digital volt meter responsive to said analog output signal of said load cell for producing said second digital signal.*

*41. A digital material flow control system in accordance with claim 39 wherein said first digital means comprises a binary rate multiplier.*

*42. A digital material flow control system in accordance with claim 39 wherein said means for selectively applying either said first or said third digital signals to said down input terminal of said up/down counter is a single pole double throw switch.*

*43. A digital material flow control system in accordance with claim 39 wherein said speed control means includes means for disabling said motor until said digital control signal reaches some predetermined value greater than one.*

*44. A digital material flow control system in accordance with claim 43 wherein said speed control means is a current output servo-amplifier responsive to said up/down counter for converting said digital control signal to an analog signal that establishes the motor speed and wherein said servo-amplifier is biased so that current flow to the motor begins when said digital control signal reaches some predetermined value greater than one.*

*45. A digital material flow control system in accordance with claim 43 wherein said means for disabling said motor until said digital control signal reaches some predetermined value greater than one includes gating means for disabling an output of the instantaneous state of said up/-down counter below said predetermined count greater than one and enabling an output of the instantaneous state of said up/down counter above said predetermined count greater than one.*

* * * * *